United States Patent
Jessberger et al.

(10) Patent No.: US 8,347,844 B2
(45) Date of Patent: Jan. 8, 2013

(54) OIL PAN FOR INTERNAL COMBUSTION ENGINE TRANSMISSION UNIT

(75) Inventors: Thomas Jessberger, Asperg (DE);
Christoph Baumann, Markgröningen (DE); Thomas Heinsch, Sachsenheim (DE); Rafael Salom, Remseck-Nedearreuis (DE)

(73) Assignee: Mann + Hummel GmbH, Ludwigsburg (DE)

( * ) Notice: Subject to any disclaimer, the term of this patent is extended or adjusted under 35 U.S.C. 154(b) by 385 days.

(21) Appl. No.: 12/664,395

(22) PCT Filed: May 23, 2008

(86) PCT No.: PCT/EP2008/056382
§ 371 (c)(1),
(2), (4) Date: Feb. 4, 2010

(87) PCT Pub. No.: WO2008/151916
PCT Pub. Date: Dec. 18, 2008

(65) Prior Publication Data
US 2010/0181146 A1      Jul. 22, 2010

(30) Foreign Application Priority Data
Jun. 13, 2007   (DE) .............. 20 2007 008 481 U

(51) Int. Cl.
F02B 77/00        (2006.01)
(52) U.S. Cl. ............ 123/195 A; 123/195 C; 123/195 R; 123/195 H; 123/196 R; 123/198 E; 184/106
(58) Field of Classification Search .............. 123/195 C, 123/196 R, 198 E, 195 A, 195 R, 195 H; 184/106
See application file for complete search history.

(56) References Cited

U.S. PATENT DOCUMENTS

| | | | | |
|---|---|---|---|---|
| 3,942,502 A * | 3/1976 | Gorres et al. | ............. | 123/195 R |
| 4,457,274 A * | 7/1984 | Gottlob | ..................... | 123/195 C |
| 4,467,754 A * | 8/1984 | Hayashi et al. | ........... | 123/195 H |
| 4,770,276 A * | 9/1988 | Takubo | ......................... | 184/106 |
| 4,793,299 A * | 12/1988 | Ishimura et al. | ......... | 123/195 R |
| 4,848,293 A * | 7/1989 | Sasada et al. | ............. | 123/195 C |
| 5,070,830 A * | 12/1991 | Malven et al. | ........... | 123/195 A |

(Continued)

FOREIGN PATENT DOCUMENTS

| | | |
|---|---|---|
| DE | 3520176 C1 | 1/1987 |
| EP | 1070834 A1 | 1/2001 |
| EP | 1469169 A1 | 10/2004 |
| EP | 1526258 | 4/2005 |
| EP | 1647680 A1 | 4/2006 |

OTHER PUBLICATIONS

International search report, German patent office search report of foreign priority application.

* cited by examiner

*Primary Examiner* — Nathaniel Wiehe
*Assistant Examiner* — Grant Moubry
(74) *Attorney, Agent, or Firm* — James Hasselbeck

(57) ABSTRACT

The invention relates to an oil pan (6) for an internal combustion engine transmission unit (1) comprising an oil pan housing (7) and a carrier flange, by way of which the oil pan housing is to be connected to the transmission housing (5) of the transmission. The carrier flange (4) is affixed to the transmission housing (5), and is connected to the oil pan housing (7) via a detachable connecting unit, wherein the connecting unit can be released or locked for the assembly and disassembly of the oil pan housing between the oil pan housing (7) and the carrier flange (9) regardless of the disassembly of the carrier flange from the transmission housing.

9 Claims, 2 Drawing Sheets

U.S. PATENT DOCUMENTS

| | | | | |
|---|---|---|---|---|
| 5,469,822 A | * | 11/1995 | Mechsner | 123/195 C |
| 6,324,744 B1 | * | 12/2001 | Banks et al. | 29/525.13 |
| 6,374,794 B1 | * | 4/2002 | Dudemaine | 123/195 H |
| 6,584,950 B1 | | 7/2003 | Cunningham | |
| 7,100,561 B2 | * | 9/2006 | Yoo | 123/195 C |
| 7,188,708 B2 | * | 3/2007 | Osman | 184/106 |
| 7,219,642 B1 | * | 5/2007 | Kwiatkowski et al. | 123/195 C |
| 7,451,736 B2 | * | 11/2008 | Migaud et al. | 123/195 C |

# OIL PAN FOR INTERNAL COMBUSTION ENGINE TRANSMISSION UNIT

CROSS REFERENCE TO RELATED APPLICATIONS

This application is US National Stage Entry of international patent application no. PCT/EP2008/056382, filed May 23, 2008 designating the United States of America, the entire disclosure of which is incorporated herein by reference. Priority is claimed based on Federal Republic of Germany patent application no. 20 2007 008 481.1, filed Jun. 13, 2007.

TECHNICAL FIELD

The invention concerns an oil pan for an internal combustion engine transmission unit according to the preamble of claim 1.

PRIOR ART

EP 0 811 761 A1 discloses an oil pan for a drive unit for motor vehicles comprising an oil pan casing that is to be attached to the bottom side of the engine block of the internal combustion engine as well as a separate grid frame that is arranged on the exterior side of the oil pan casing and encloses the oil pan casing. The grid frame is comprised of bending-resistant material and supports and protects the oil pan casing that is made of soft-elastic plastic material. The attachment of the grid frame is realized together with the oil pan casing by screwing them to the engine block by means of aligned bores in the oil pan casing and a circumferentially extending flange of the grid frame.

In addition, the grid frame can be connected by a part-circular connecting flange to the transmission casing of the transmission that adjoins immediately the engine block. When demounting the oil pan, in particular for servicing purposes, it is necessary to detach the grid frame from the engine block as well as from the transmission casing in order to be able to also remove the oil pan casing. This increases the servicing expenditure.

SUMMARY OF THE INVENTION

The invention has the object to configure an oil pan for an internal combustion engine transmission unit with simple constructive measures in such a way that mounting as well as demounting can be realized with minimal expenditure.

This object is solved according to the invention with the features of claim 1. The dependent claims provide expedient further embodiments.

The oil pan according to the invention for an internal combustion engine transmission unit comprises an oil pan casing that is to be arranged on the bottom side of the engine block and is to be connected therewith as well as a support flange that is the support of the oil pan casing and is connected to the transmission casing. The coupling of the oil pan casing to the support flange is realized by means of a detachable connecting device that can be actuated, i.e., released or connected, independent of demounting of the support flange from the transmission casing. In this way, the possibility is provided, in particular for servicing purposes, to release the oil pan casing from its mounted position without having to remove at the same time the support flange from the transmission casing. Only the connecting devices between the oil pan casing and the support flange must be released wherein, if need be, also an immediate connection between the oil pan casing and the engine block is to be released so that the oil pan casing can be removed. If need be, it is also sufficient to attach the oil pan casing exclusively to the support flange without connecting the oil pan casing directly to the additional component, in particular the engine block.

As a whole, mounting and demounting of the oil pan according to the invention is much simpler than in the prior art because the support flange, even for servicing work, may remain in its position on the transmission casing. In this connection, it is in particular possible and advantageous that the oil pan casing is screw-connected to the support flange and, if need be, also to the engine block wherein the orientation of all screw connection devices is expediently uniform, in particular vertical to the bottom side of the engine block so that all connecting screws are screwed in in the same direction.

The support flange optionally can also be attached to the engine block so that an additional stiffening of the internal combustion engine transmission unit is achieved. This connection between the support flange and the engine block is realized either independent of the connection between the oil pan casing and the engine block or, according to a further embodiment, it is a common connection, in particular, a screw connection in which the screws are passed through the wall of the oil pan casing as well as through the support flange.

According to a preferred embodiment the support flange is comprised of light metal, in particular of aluminum, and the oil pan casing is made of plastic material, in particular of injection-molded plastic material. Moreover, it can be expedient to configure the oil pan casing in two parts with a top part and a bottom part that are in particular welded together, for example, by friction welding. The two-part configuration of the oil pan casing provides the possibility for enlarging the volume of the oil pan in that the bottom part of the casing provides an additional oil receiving space. The bottom part extends advantageously only across a partial surface area of the top part wherein, if need be, also embodiments are to be considered in which the top part and the bottom part extend across the same cross-sectional surface area.

The oil pan casing expediently is provided with support sleeves that are components of a screw-connection device between the oil pan casing and the engine block and/or the support flange. The support sleeves provide a guiding action for the screws and enable particularly a screw connection of the bottom part as well as of the top part with the engine block or the support flange, for which purpose the support sleeves extend across the entire height of bottom part and top part. In this way, it is possible to screw-connect the oil pan casing from below to the engine block. Expediently, the support sleeves are integrally formed on the bottom and top parts. The total height of the support sleeves is comprised of the sections in the bottom part and in the top part that are joined at the connecting location between bottom part and top part.

Moreover, it can be expedient to provide in the connecting device between oil pan casing and support flange bushings as well as correlated bushing receptacles wherein the bushings and the bushing receptacles in the mounted state are to be brought into alignment so as to form a common screw connection passage. This provides the possibility to construct the oil pan casing and the support flange as a pre-mounted modular component in that the bushings and the bushing receptacles, for example, are connected to one another by friction fit connection or a positive fit connection. In this way, these two components are secured relative to one another without further connecting devices. For example, the bushings can be clamped in the bushing receptacles with friction fit wherein in this state the module, comprised of oil pan casing and support flange, is moved into the mounting position and is mounted on the engine block or the transmission casing. The assembly causes at the same time the fixed connection between the support flange and the oil pan casing is realized.

According to a further advantageous embodiment, the support flange extends at least section-wise into the area between the engine block and the oil pan casing. For this purpose, the oil pan casing has expediently a recess that is matched to the support flange or a step that, in the mounted position, is filled in by a portion of the support flange.

BRIEF DESCRIPTION OF THE DRAWINGS

Further advantages and expedient embodiments can be taken from the additional claims, the figure description and the drawings. It is shown in:

In the Figures the same components are identified with same reference numerals.

EMBODIMENT(S) OF THE INVENTION

Figure 1:
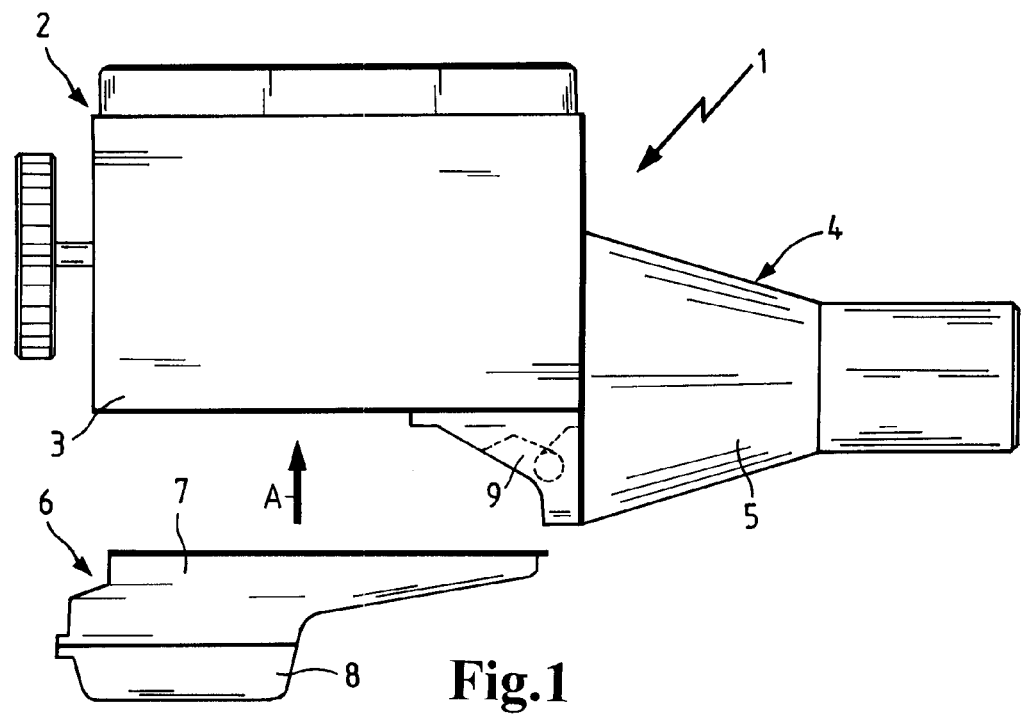
FIG. 1 an internal combustion engine transmission unit with an internal combustion engine, a transmission as well as an oil pan that is to be mounted on the engine block of the internal combustion engine, wherein the oil pan casing is to be attached by a support flange to the transmission casing.

As shown in FIG. 1, the internal combustion engine transmission unit 1 comprises an internal combustion engine 2 with an engine block 3 as well as a transmission 4 in a transmission casing 5 wherein the transmission casing 5 is connected to the engine block 3. Moreover, an oil pan 6 is provided which is to be attached to the bottom side of the engine block 3 and is configured of two parts with a top part 7 and a bottom part 8. The oil pan casing with top part 7 and bottom part 8 is comprised expediently of plastic material: the oil pan casing is to be moved into the assembly position as indicated by the arrow. The oil pan 6 has also correlated therewith a support flange 9 that is of an angled configuration and is positioned at the step between the engine block 3 and the transmission casing 5 and is to be connected at least with the transmission casing, expediently also with the engine block.

Figure 2:
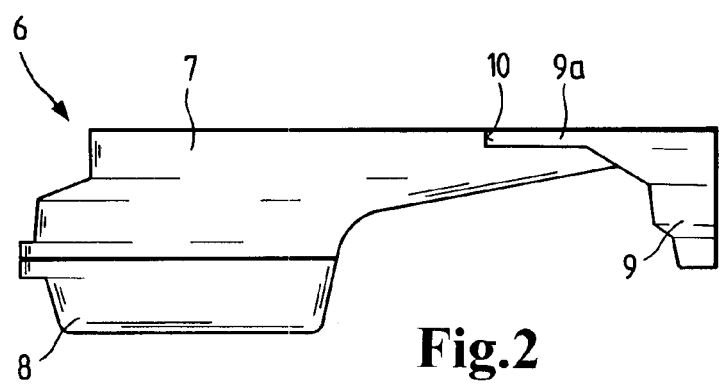
FIG. 2 a detail illustration of the oil pan with a two-part oil pan casing comprised of top part and bottom part and with the support flange that is connected to the top part.

As shown in FIG. 2, in the mounted position the top part 7 of the oil pan casing is connected with the support flange 7. The support flange 9 has a laterally projecting section 9a that projects into a recessed step 10 in the top part 7 of the oil pan casing such that, when the oil pan casing is mounted on the support flange 9, a smooth continuous topside is formed that is to be brought into contact with the bottom side of the engine block. The oil pan casing is to be detachably connected to the support flange 9. The connecting direction is realized in particular in the mounting direction of the oil pan casing, i.e., perpendicularly from bottom to top. At the same time, it is possible to provide the support flange 9 for connection with the transmission casing 5 with connecting devices that act in the transverse direction, for example, by means of screws extending in the transverse direction. Since mounting and demounting of the oil pan casing on or from the support flange 9 is independent of its attachment on the transmission casing and/or on the engine block, the oil pan casing together with the top part 7 and the bottom part 8 can be detached for servicing purposes from the support flange 9 and the engine block 3 with minimal expenditure without at the same time having to remove the support flange from the transmission casing.

Figure 3:
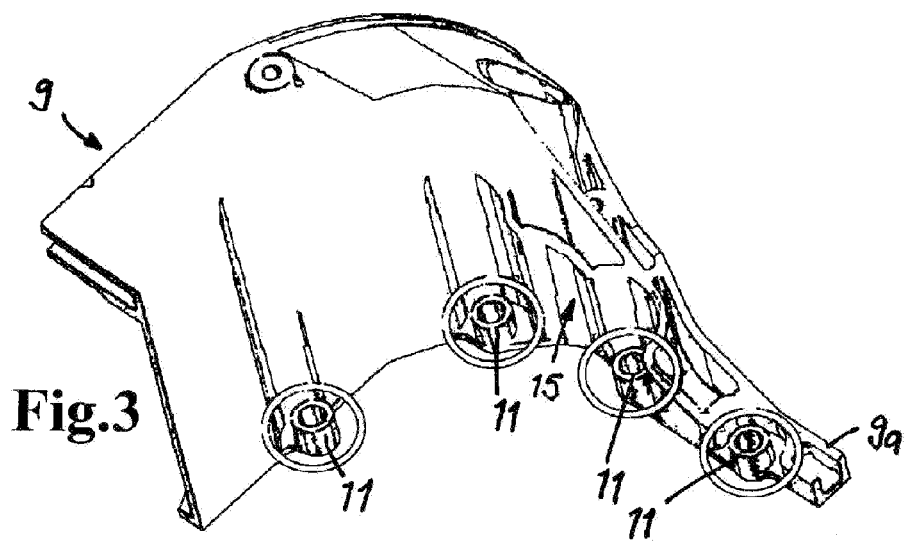
FIG. 3 a perspective illustration of the support flange with a total of four screw bushings that are identified by circles and a support flange attachment point.
Figure 4:
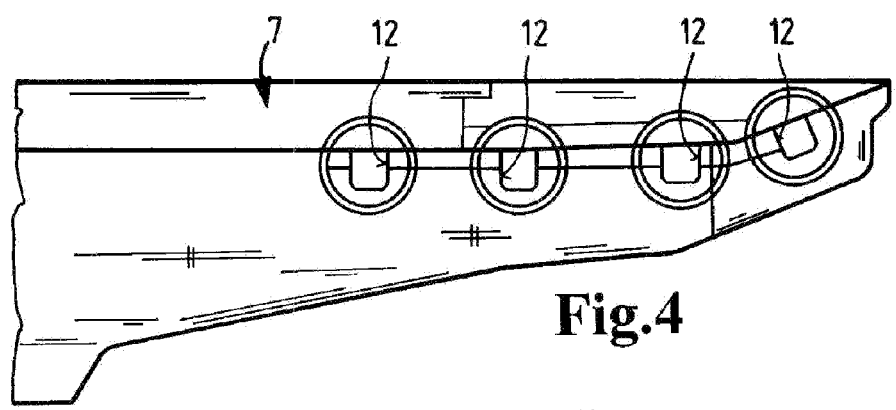
FIG. 4 a perspective illustration of the top part of the oil pan casing, also with four bushing receptacles illustrated by four circles that, in the mounted state, are positioned in an aligned position with the screw bushings in the support flange.

As can be seen in FIGS. 3 and 4, the connection between the support flange 9 and the top part 7 of the oil pan casing is realized by means of bushings 11 on the support flange and correlated bushing receptacles 12 on the top part. The bushings 11 and the bushing receptacles 12 are separately identified in the Figures. When the oil pan is mounted, the bushings 11 are positioned in the respective bushing receptacles 12 and form a common continuous screw passage for receiving a screw. The bushings 11 are located on the support flange 9 and are arranged about the corner. The same holds true also for the bushing receptacles 12 on the top part 7 of the oil pan casing.

The bushings 11 are to be inserted particularly even without other screw or connecting devices in a positive fit or friction fit in the bushings receptacles 12. This provides the possibility, even before assembly, of producing a continuous module comprised of the oil pan casing and the support flange 9 which then is to be brought into in the mounted position on the bottom side of the engine block or the transmission casing.

In FIG. 3 a fastening point 15 is shown by means of which the support flange 9 after demounting of the oil pan is secured on the engine block. Expediently, at least two fastening points 15 are provided on the support flange.

Figure 5:
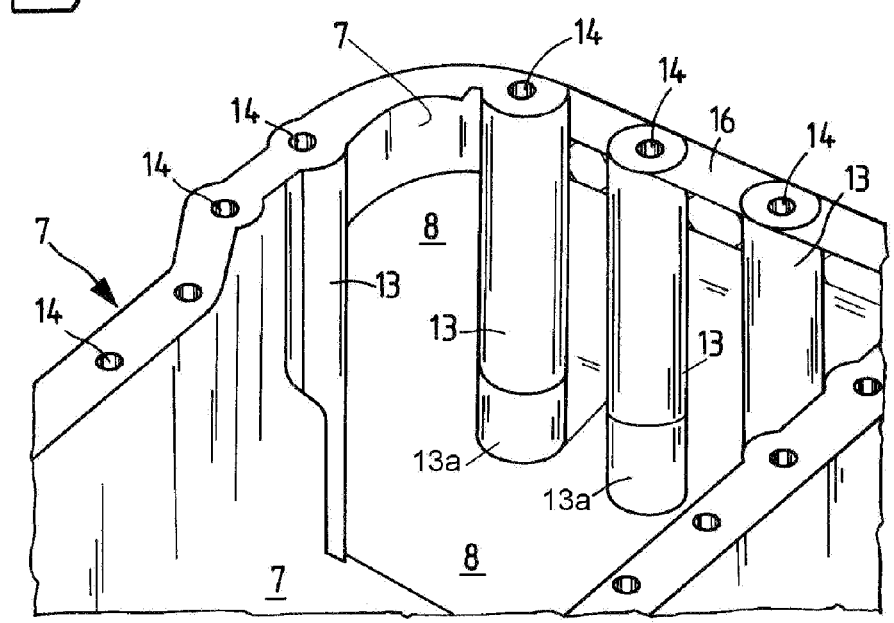
FIG. 5 a perspective illustration of the interior of the oil pan casing with several screw connecting support sleeves by means of which the oil pan casing is to be immediately screw-connected to the engine block.

As shown in FIG. 5, the top part 7 of the oil pan casing has a circumferentially extending fastening rim or flange in which several receptacles 14 are provided by means of which the top part is to be screw-connected to the engine block. Moreover, fastening support sleeves 13 and 13a are provided that extend starting at the bottom part 8 (sleeve 13a) that is connected fixedly to the top part 7 (sleeve 13) across the entire height of the oil pan casing. The support sleeves 13 and 13a are integrally cast in the top part and bottom part and are joined at the connecting location between top and bottom part. The fastening support sleeves 13 and 13a have also recesses 14 in order to enable a screw connection at the engine block which has for this purpose a corresponding hole pattern.

The invention claimed is:

1. An oil pan for an internal combustion engine transmission unit (1), comprising
   a two-part oil pan casing (7, 8), the oil pan casing including
      a top part (7) and
      a bottom part (8),
   wherein the oil pan casing (7, 8) parts are an injection-molded plastic material, a support device (9) by means of which the oil pan casing (7, 8) is to be connected to a transmission casing (5) of the transmission (4),
   wherein characterized in that the support device is embodied as a support flange (9) that is connected to the transmission casing (5) of the transmission (4) and on which, by means of a releasable connecting device, the oil pan casing (7, 8) is secured,
   wherein the connecting device between oil pan casing (7, 8) and support flange (9) is releasable and connectable for mounting and demounting of the oil pan casing (7, 8)

independent of demounting of the support flange (9) from the transmission casing (5), wherein the connecting device between oil pan casing (7, 8) and support flange (9) comprises bushings (11) and correlated bushing receptacles (12) that are to be brought into alignment and together form a screw-connection passages, wherein the bushings (11) and the bushing receptacles (12) are mountably engaged with one another by a friction fit, the friction fit mountable engagement of the bushings between the oil pan casing and the support flange (9) producing a releasable mounted engagement of the oil pan casing (6, 7) onto the support flange (9), without the use of other screws or connecting devices.

2. The oil pan according to claim 1, wherein the support flange (9) is mountably attached additionally on the engine block (3).

3. The oil pan according to claim 1, wherein the support flange (9) is comprised of aluminum.

4. The oil pan according to claim 1, wherein the top part (7) and a bottom part (8) of the oil pan casing are welded to one another.

5. The oil pan according to one of the claim 1, 2, 3 or 4, wherein the oil pan casing (7, 8) is also attached immediately on the engine block (3).

6. The oil pan according to claim 5, wherein the top part (7) includes support sleeves (13) integrally cast into the top part, wherein the bottom part includes support sleeves (13a) integrally cast into the bottom part and connected to the sleeves (13) in the top part (7), wherein screws are introduced to screw-connect the oil pan casing (7, 8) to the engine block (3).

7. The oil pan according to claim 6, wherein the support sleeves (13) extend across the bottom part (7) and the top part (8) of the oil pan casing.

8. The oil pan according to claim 1, wherein the support flange (9) extends at least section-wise between the engine block (3) and the oil pan casing (7, 8), wherein the oil pan casing (7) includes a recessed step (10) between the oil pan casing (7) and the engine block (3), wherein the support flange (9) includes a laterally projecting section (9a) that is received into the recessed step (10) between the oil pan casing (7) and the engine block (3), thereby forming a smooth continuous topside of the oil pan casing (7), the smooth continuous top side connected to the engine block (3).

9. The oil pan according to claim 8, wherein:

the top part (7) includes support sleeves (13) integrally cast into the top part, the bottom part includes support sleeves (13a) integrally cast into the bottom part and connected to the sleeves (13) in the top part (7);

screws are introduced to screw-connect the oil pan casing (7, 8) to the engine block (3)

the support sleeves (13) extend across an entire height of the bottom part (7) and the top part (8) of the oil pan casing, enabling screw connection of the oil pan from below the engine block.

\* \* \* \* \*